(12) United States Patent
Singh et al.

(10) Patent No.: US 12,081,729 B2
(45) Date of Patent: Sep. 3, 2024

(54) SQUARE ORIENTATION FOR PRESENTATION OF CONTENT STEREOSCOPICALLY

(71) Applicant: Lenovo (Singapore) Pte. Ltd., Morrisville, NC (US)

(72) Inventors: Kuldeep Singh, Morrisville, NC (US); Poorna Prasad Vishwanath, Morrisville, NC (US); Raju Kandaswamy, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 125 days.

(21) Appl. No.: 17/812,987

(22) Filed: Jul. 15, 2022

(65) Prior Publication Data
US 2024/0022703 A1    Jan. 18, 2024

(51) Int. Cl.
| | | |
|---|---|---|
| *H04N 13/366* | (2018.01) | |
| *G06F 3/01* | (2006.01) | |
| *G06F 3/04815* | (2022.01) | |
| *G06F 9/451* | (2018.01) | |
| *G06T 11/00* | (2006.01) | |
| *G06T 15/00* | (2011.01) | |
| *H04M 1/72409* | (2021.01) | |
| *H04M 1/72412* | (2021.01) | |
| *H04M 1/72454* | (2021.01) | |
| *H04N 13/279* | (2018.01) | |
| *H04N 13/332* | (2018.01) | |

(52) U.S. Cl.
CPC ...... *H04N 13/366* (2018.05); *H04M 1/72412* (2021.01); *H04N 13/279* (2018.05); *H04N 13/332* (2018.05); *G06F 3/011* (2013.01); *G06F 3/04815* (2013.01); *G06F 9/451* (2018.02); *G06T 11/001* (2013.01); *G06T 15/00* (2013.01); *H04M 1/724097* (2022.02); *H04M 1/72454* (2021.01)

(58) Field of Classification Search
CPC .. H04N 13/366; H04N 13/279; H04N 13/332; H04M 1/72412
See application file for complete search history.

(56) References Cited

U.S. PATENT DOCUMENTS

2018/0308288 A1*  10/2018  Harscoet ............. G06F 3/04815

OTHER PUBLICATIONS

Zielinski, Evaluating the Effects of Image Persistence on Dynamic Target Acquisition in Low Frame Rate Virtual Environments, 2016, IEEE (Year: 2016).*

(Continued)

*Primary Examiner* — YuJang Tswei
(74) *Attorney, Agent, or Firm* — John M. Rogitz; John L. Rogitz (57) ABSTRACT

In one aspect, at least a first device includes at least one processor and storage accessible to the at least one processor. The storage includes instructions executable by the at least one processor to execute a first application (app) at a first device, where the first app is configured for presenting content stereoscopically in three dimensional (3D) space using a headset. The instructions are also executable to use the first app to request, from a second app, a virtual display in a square orientation. The instructions are then executable to receive, from the second app, the virtual display in the square orientation and to use the first app to present, in 3D space on a display of the headset, the virtual display in the square orientation.

20 Claims, 7 Drawing Sheets

(56) References Cited

OTHER PUBLICATIONS

Analysis of adaptive streaming technologies for segmented multimedia transport of high-resolution videos for 360Â° playback on multiple devices (Year: 2019).*

Naz et al, Emotional Qualities of VR Space—May 2022, IEEE (Year: 2022).*

* cited by examiner

SQUARE ORIENTATION FOR PRESENTATION OF CONTENT STEREOSCOPICALLY

FIELD

The disclosure below relates to technically inventive, non-routine solutions that are necessarily rooted in computer technology and that produce concrete technical improvements. In particular, the disclosure below relates to using a square orientation to present content stereoscopically.

BACKGROUND

As recognized herein, when a mobile device detects a change in physical orientation of the mobile device, it might switch from presenting two dimensional (2D) content in landscape orientation to presenting the 2D content in portrait orientation (and vice versa). Or the app presenting the 2D content might only support portrait orientation.

As also recognized herein, such a mobile device might also be used to present augmented reality (AR) content at a headset in landscape orientation, where the AR content is derived from the 2D content. The disclosure below therefore recognizes that should a change in the mobile device's physical orientation trigger a switch in the orientation of the 2D content to portrait orientation at runtime (or if the 2D app only presents content in portrait orientation), when the 2D content is translated into three dimensional (3D) space for presentation as part of the AR content, the corresponding 3D content will look small, distorted, and/or otherwise unsatisfactory to the user in portrait orientation. This can be due to the headset execution environment often being fixed to, or at the very least more suitable for, landscape orientation even though the underlying 2D content itself is currently formatted for portrait orientation.

Additionally, were the user to change the mobile device's orientation back and forth, the serial switching between landscape and portrait orientations can cause a jittery effect when viewing the corresponding stereoscopic content at the headset, further undermining the AR simulation, making the content difficult to follow, and making it difficult for the user to accurately provide user input.

There are currently no adequate solutions to the foregoing computer-related, technological problems.

SUMMARY

Accordingly, in one aspect at least a first device includes at least one processor and storage accessible to the at least one processor. The storage includes instructions executable by the at least one processor to execute a first application (app) at the first device, where the first app is configured for interfacing presentation of content between two dimensional (2D) space and three dimensional (3D) space. The instructions are then executable to request, from a second app, a virtual display in a square orientation. Thereafter, the instructions are executable to receive, via the first app, the virtual display in the square orientation and to use the first app to present, in 3D space on a display of a headset, the virtual display in the square orientation.

In various example embodiments, the second app may be a guest operating system. Additionally or alternatively, the second app may be a 2D app that accesses the Internet to present visual content.

Additionally, in various example implementations the square orientation may be established by a 1920×1920 resolution.

Still further, if desired the first app itself may issue the request. The first app may do so based on the first app accessing configuration data indicating that content from a third app is approved for presentation in square orientation. The third app may be the same as or different from the second app. Additionally, if desired the configuration data may form part of a plugin for the first app.

Also in various example embodiments, the instructions may be executable to receive user input to present content from a third app in landscape orientation and, based on the user input, request, from the second app, a virtual display in a landscape orientation. The instructions may then be executable to receive, via the first app, the virtual display in the landscape orientation and then to use the first app to present, in 3D space on the display of the headset, the virtual display in the landscape orientation. In some specific examples, the user input may include input to present content from the third app full-screen.

Also in certain examples, the at least first device may include the headset. Additionally or alternatively, the at least first device may include a mobile device that executes the first and second apps, where the mobile device may be different from the headset.

Further note that in example implementations, the first app may present the virtual display stereoscopically.

In another aspect, a method includes executing a first application (app) at a first device, where the first app is configured for presenting content stereoscopically in three dimensional (3D) space using a headset. The method also includes using the first app to request, from a second app, a virtual display in a square orientation. The method then includes receiving, at the first app and from the second app, the virtual display in the square orientation. Thereafter, the method includes using the first app to present, in 3D space on a display of the headset, the virtual display in the square orientation.

In certain examples, the second app may be a guest operating system of a mobile device. Also in certain examples, the square orientation may be established by a 1920×1920 resolution.

Still further, if desired the method may include using the first app itself to issue the request.

In still another aspect, at least one computer readable storage medium (CRSM) that is not a transitory signal includes instructions executable by at least one processor to execute a first application (app) at a first device. The first app is configured for presenting content stereoscopically in three dimensional (3D) space using a headset. The instructions are also executable to use the first app to request, from a second app, a virtual display in a square orientation. The instructions are then executable to receive, from the second app, the virtual display in the square orientation and to use the first app to present, in 3D space on a display of the headset, the virtual display in the square orientation.

In certain specific examples, the square orientation may be established by a 1920×1920 resolution, such as a 1920×1920 resolution at 520 dots per inch (dpi).

The details of present principles, both as to their structure and operation, can best be understood in reference to the accompanying drawings, in which like reference numerals refer to like parts, and in which:

DETAILED DESCRIPTION

Among other things, the detailed description below recognizes that it is desirable for 2D mobile apps (designed for 2D space rendered on a flat screen display as may be built using a mobile device SDK such as Android's SDK) to be run in a 3D virtual environment in cross-compatible fashion. The 2D app might be Google's Chrome or Microsoft's Teams, for example. The detailed description below further recognizes that it is desirable to not require 2D app programmers to change the functioning of the 2D app itself as this is technologically complex if even possible given the numerous different types of 3D SDKs used in different headsets as the 3D SDKs are often manufacturer-specific. Likewise, the detailed description below recognizes that it is desirable to not require the 3D SDK programmers to change the functioning of the 3D SDK itself as this too is technologically complex and inhibiting.

App Space is therefore discussed below as an example of an app that may be used to make immersive 3D interactions possible for 2D apps. App Space may therefore be a mobile-based app and user interface that renders the 2D apps in a spatial environment and takes care of converting coordinates for the spatial coordinate system to coordinates for the 2D coordinate system in runtime. An app repositioning system is also disclosed as part of App Space to place the apps in three-dimensional spatial environment. Converted interactions can be extended to all the 3D interactions provided by the underlying SDK for the headset, such as raycast, scroll, swipe, long-press, double tap, gesture and voice.

Thus, in one example App Space may first render the 2D app(s) in a 3D spatial environment so that the rendered apps appear floating in front of the user, e.g., in square orientation as set forth below. Then, when the user performs an interaction using 3D spatial methods, App Space converts the 3D interaction method and the 3D spatial coordinates at which the interaction occurred to a 2D coordinate system and interaction method recognizable by the 2D mobile app.

Accordingly, App Space may intercept the 3D AR coordinates from a 3D cursor and convert them to 2D coordinates, and covert all AR interactions such as AR clicks, AR scrolls, and AR text input to 2D app interactions such as "phone touches"/keyboard events. This architecture of App Space may therefore be flexible and leverage the capability of the headset's underlying 3D SDK, native APIs and 3D engine, making App Space's architecture open for many different platforms. In some specific examples, App Space may even be established by a 3D Container App for 2D/3D conversion, the underlying native 3D SDK of the headset itself for stereoscopic rendering and identifying/processing 3D user inputs (e.g., Lenovo's A3 Home and/or Unity), and an App Space Service. The components of coordinate conversion, square orientation, and interactions may work for other platforms too (e.g., not just Android-based mobile devices but also Mac and Linux-based devices using appropriate programming code for those other platforms).

It may therefore be appreciated that a 3D version of a 2D app need not exist for 3D rendering, and that nothing in the underlying 2D app itself need be customized either. Instead, the 2D app/content may be rendered in a 3D container, and the 2D app may not even know that it is being rendered in 3D space in square orientation. Rather, the 2D app continues to assume it is operating per 2D pixel coordinates, possibly in portrait orientation.

Interactions in 3D using App Space may be done per the following examples:

As one example, a 3D pointer, such as a cursor located in the center of the user's field of view (FOV) like a 3D Gaze pointer or a Raycast emanating from an attached device (e.g., phone), may be used and serve as a 3DoF controller.

Other selection methods may include a touchpad on a phone/mobile screen that accepts tap and swipe inputs (e.g., provided by a 2D companion app), a hardware button located on the attached compute/mobile device (e.g., phone, compute pack, etc.), hand gestures, and voice commands.

Keyboard key presses may also be used, such as from Android's native on-screen keyboard or from an AR keyboard.

When an interaction event occurs, App Space may do the following in various examples:

First, convert the coordinates of the 3D pointer (cursor or raycast) to corresponding screen coordinates.

Convert the 3D selection method (tap, scroll, etc.) to one understandable by the 2D app.

Inject the respective interaction event to the underlying 2D app.

In the case of key press, these events may be received either via native on-screen keyboard or via AR keyboard and may be injected to the currently-selected text input field of the 2D app's virtual display.

Additionally, in various examples, this may be done while the content is presented at the headset in square orientation as provided in a virtual display by the mobile device's guest operating system or other app executing at the mobile device. Thus, square orientation can run in App Space since the headset content presentation orientation does not change with changes in headset/handset orientation to thus run the 2D app in 3D space without losing image fidelity. Thus, some or all windows from various 2D apps can be presented in 3D space with proper fidelity via square orientation, notwithstanding any changes in mobile device orientation that would otherwise trigger changes in content orientation at the headset.

Thus, in one example embodiment, square orientation may be handled at the operating system level or application layer. AppSpace may implement square orientation for all the phone 2D apps, and it may run all the phone 2D apps in 1920×1920 resolution in the AR Glass/headset. So even if the mobile device/phone orientation changes, this will not impact the user experience in the AR glass/3D environment.

Also in certain example embodiments, since some mobile 2D applications are designed and developed for a specific orientation (landscape), in such cases, a provision may be used to specify orientation for those particular apps since they can run well in landscape orientation and the orientation will not change at run time. Thus, those specified apps can be run in landscape orientation, with a default orientation of square orientation otherwise being used. AppSpace may thus convert 3D coordinates to 2D screen coordinates so that it can covert AR interactions to touch screen interactions. The orientation plays a role in calculation of the offset for coordinate conversation and hence default square orientation or constant landscape orientation helps improve and streamline the accurate processing of the coordinate conversion.

As for the coordinate conversion itself, note that App Space may intercept the 3D spatial coordinates (e.g., from the headset's manufacturer-provided SDK) and convert them to 2D coordinates. Also note here that App Space may not just convert 3D coordinates to 2D coordinates to provide to the 2D app running on the mobile device but may also convert 2D coordinates from the 2D app itself into 3D coordinates for passing back to the headset's 3D SDK for 3D renderings.

Before describing the coordinate calculations in detail, also note more generally that for the virtual display 2D source coordinate system, Android images may be formed by pixels and represented in the pixel coordinate system. As for the 3D spatial coordinate system, 3D textures may be bitmap images that have different origin and axis arrangements. Thus, in order to perform clicks or selections on the 2D app at the correct places (e.g., represent 3D eye gaze select actions as 2D touch events to the 2D app), a physics raycasting may be done on the 3D texture to obtain the 3D coordinates that the user is looking at. Then, with the mobile device knowing the 3D coordinates, a coordinate conversion may be performed from 3D texture space into 2D pixel space using the following functions:

$$\text{Pixel } X = F(\text{Texture } X), \text{ where } F = (0.5 + \text{Texture } X) * W$$

$$\text{Pixel } Y = F(\text{Texture } Y), \text{ where } F = (0.5 - \text{Texture } Y) * H$$

For example, (−0.3,0.2) in texture space would translate to (216, 576) as calculated below, given that width=1080 and height=1920:

$$\text{Pixel } X = (0.5 + (-0.3)) * 1080 = 216$$

$$\text{Pixel } Y = (0.5 - (0.2)) * 1920 = 576$$

Also note that the reverse calculation of (216,576) in 2D pixel space may translate into (−0.3,0.2) in texture space as given by the following functions:

$$\text{Texture } X = F(\text{Pixel } X), \text{ where } F = (\text{Pixel } X/W) - 0.5$$

$$\text{Texture } Y = F(\text{Pixel } Y), \text{ where } F = 0.5 - (\text{Pixel } Y/H)$$

With the coordinate conversions themselves being set forth, immersive interactions for which the conversions may be used will now be discussed.

Interactions in 3D space (that may be translated to 2D interactions using App Space) may occur using any number of different 3D input modalities, including but not limited to gaze pointer, raycast, hand/arm gestures, and voice input. These interactions and input modalities may be supported for any 3D app using the headset manufacturer's SDK (e.g., the ThinkReality SDK) and/or App Space itself. Events may thus be injected via Virtual Display APIs to the underlying 2D app. Below are descriptions of how different interactions may be performed in App Space or whatever 3D to 2D conversion app is being used.

For click/select interactions, App Space may inject a finger touch event at pixel coordinates converted from the cursor pointer location in Unity when a gaze select event or companion app tap event or other event occurs. The following is Android code for the injection:

```
public void click(int displayID, final int x, final int y) {
    long 11owntime = SystemClock.uptimeMillis( );
    //These injectMotionEvents is to perform Tap
    injectMotionEvent(displayID, MotionEvent.ACTION_DOWN, 11 owntime,
11owntime, x, y);
        long eventTime = SystemClock.uptimeMillis( );
        injectMotionEvent(displayID, MotionEvent.ACTION_UP, 11 owntime,
eventTime, x,y);
    }
```

For longpress interactions the long press may be supported by long-pressing of a button on the headset (e.g., the Lenovo A3 glass Center Key button) for a threshold amount of time such as two seconds, or a longpress on the companion mobile app/display/trackpad. App Space may then inject finger touch events (ACTION_DOWN using finger, hold it down and then after a delay lifting finger using ACTION_UP) according to the following Android code:

```
public void longPress(int displayID, final int x, final int y) {
    long 12owntime = SystemClock.uptimeMillis( );
    injectMotionEvent(displayID, MotionEvent.ACTION_DOWN, 12 owntime,
12owntime, x, y);
        Thread.sleep(ViewConfiguration.getLongPressTimeout( ) +
LONG_PRESS_TIMEOUT_BUFFER);
            12owntime = SystemClock.uptimeMillis( );
            long eventTime = SystemClock.uptimeMillis( );
            injectMotionEvent(displayID, MotionEvent.ACTION_UP, 12 owntime,
eventTime, x, y);
```

-continued

```
}
For back button interaction, back functionality may be supported in an AR user
interface (UI) at the headset (e.g. Lenovo A3 using App Space) as well from the 2D
companion app/mobile device itself. App Space may thus inject a keyboard event with
KEYCODE_BACK into the 2D app as follows:
    public void goBack(int displayID) {
    serviceConnection.injectKeyEvent(new KeyEvent(ACTION_DOWN,
KEYCODE_BACK), displayID);
    serviceConnection.injectKeyEvent(new KeyEvent(ACTION_UP,
KEYCODE_BACK), displayID);
    }
```

Note that similar programming language and a corresponding keycode may be used for a "close" command to close a window or other graphical object.

For scroll interactions, scrolling may be supported in an AR UI at the headset (e.g., Lenovo A3 using App Space) by injecting mouse scroll events (ACTION_SCROLL for TOOL_TYPE_MOUSE). Thus, AR UI scrolls via Scroll Up/Down buttons may be performed as a fixed-step scroll. Scrolling from the 2D companion app trackpad or touch-enabled display (e.g., up/down/left/right scroll gestures) may also be supported as continuous scrolls and App Space may thus inject scroll events based on the velocity and distance covered on trackpad.

For double tap/double-click interactions, double taps on the 2D companion app/mobile device display may also be supported similar to the click/select interactions set forth above but to establish a 2D double tap.

Turning now to text input modalities for conversion to 2D coordinates for passing of text input to the 2D app on the mobile device, the initial text input may be performed via an on screen 3D keyboard in AR/VR as presented at the headset, or via a keyboard as presented on the display of the mobile device. If the input is provided to the native 3D keyboard or to the mobile device keyboard, the key input for whatever key is selected may be passed to the 2D app. For input to a keyboard from a 2D app executing at the mobile device (or from the mobile device itself) but as presented in 3D virtual space on the headset display, App Space may intercept all the key events and inject to the focused Virtual Display using Android's virtual display APIs according to the coordinate conversions discussed above (e.g., based on the 3D coordinates of a gaze pointer or raycast being used for key selection).

Still in terms of different 3D user interactions that may be injected into a 2D app as a 2D action, the following table further illustrates. This table may be thought of as a key map indicating how various user interactions are converted to Android terms for injection into an Android-based 2D app even with square mode enabled. Thus, the table below sets forth various events and their corresponding Android mapping. The Android Key codes may be provided through the Android SDK. Thus, the appropriate events may be generated programmatically for each type of user interaction indicated in the event column as follows:

| Event | Android Key Code | Comments |
|---|---|---|
| Click | MotionEvent.ACTION_DOWN<br>MotionEvent.ACTION_UP | Two motion events are programmatically generated and passed on, first event ACTION_DOWN followed by ACTION_UP |
| Hover | MotionEvent.ACTION_HOVER_MOVE | Whenever gaze movement is detected over the AppSpace canvas an ACTION_HOVER_MOVE event is programmatically generated and fired |
| Keyboard | KeyEvent.ACTION_DOWN<br>KeyEvent.ACTION_UP | Whenever a key is pressed in AR Keyboard, two key events are generated and fired programmatically, ACTION_DOWN followed by ACTION_UP. Both events will also have the same key code of the key being pressed. For example, for the enter key press, "KeyEvent.KEYCODE_ENTER" will be present in both ACTION_DOWN and ACTION_UP |
| Long Click | MotionEvent.ACTION_DOWN<br>Thread.Sleep(200)<br>MotionEvent.ACTION_UP | Similar to click, but in between ACTION_DOWN and ACTION_UP, a programmatical delay (sleep) of 200 ms is introduced to simulate interval |
| Back | KeyEvent.ACTION_DOWN<br>KeyEvent.ACTION_UP | Similar to keyboard events, but the generated event will have the key code as KeyEvent.KEYCODE_BACK |

| Event | Android Key Code | Comments |
| --- | --- | --- |
| Horizontal Scroll | MotionEvent.AXIS_HSCROLL MotionEvent.ACTION_SCROLL | First AXIS_HSCROLL will be called to set the amount of scroll followed by the ACTION_SCROLL programmatically |
| Vertical Scroll | MotionEvent.AXIS_VSCROLL MotionEvent.ACTION_SCROLL | First AXIS_VSCROLL will be called to set the amount of scroll followed by the ACTION_SCROLL programmatically |
| Fling | MotionEvent.ACTION_DOWN MotionEvent.ACTION_MOVE MotionEvent.ACTION_UP | First ACTION_DOWN followed by a bunch of ACTION_MOVE and finally ACTION_UP. All events generated and fired programmatically |
| Double Tap | MotionEvent.ACTION_DOWN MotionEvent.ACTION_UP | Similar to click, but fired twice in short intervals programmatically |

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
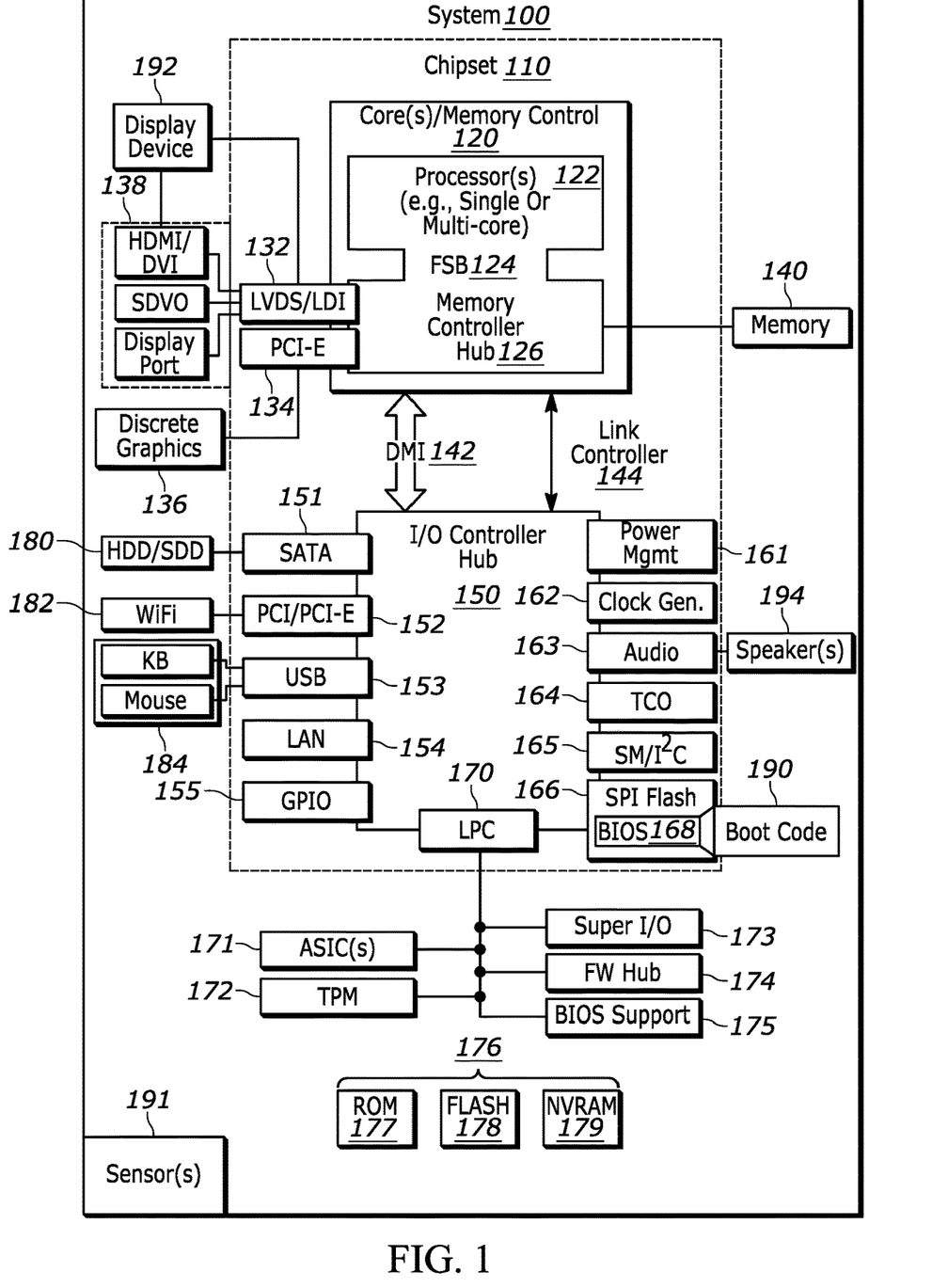
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, one or more forward-facing cameras might be on a headset being worn by a user so that the system 100 may execute computer vision (e.g., for 3D real-world location tracking), and one or more inward-facing cameras might also be on the headset for eye tracking.

In addition to or in lieu of the foregoing, the sensors 191 may include one or more inertial measurement sensors that might be included in an inertial measurement unit (IMU) for location tracking and device orientation identification (e.g., dead reckoning for location tracking, orientation identification to determine whether to present content in landscape or portrait orientation). For example, the system 100 may be embodied in a mobile device and the inertial measurement sensors may be located on the mobile device to determine whether the user is holding the system 100 in portrait orientation where the long axis of the device/display is oriented vertically or in landscape orientation where the long axis of the device/display is oriented horizontally. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as a voice command as described herein. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
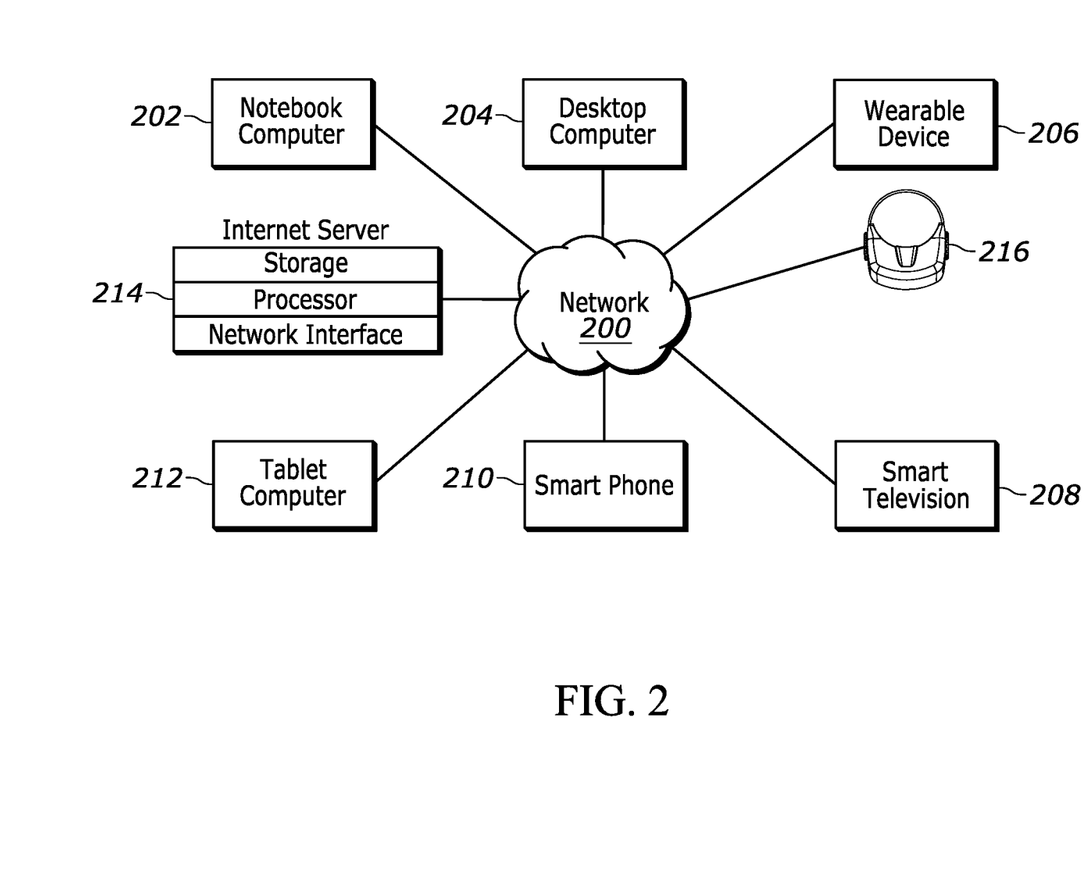
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
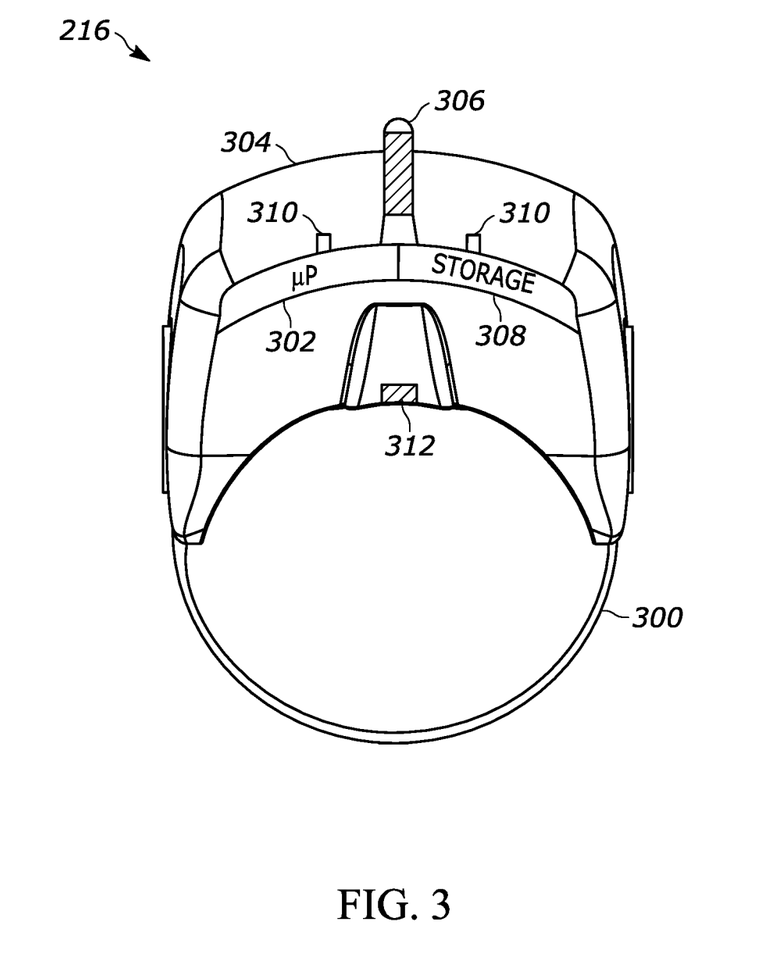
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used for gesture recognition to recognize gestures made by the user using their hand, arm, etc. consistent with present principles. However, further note that the camera(s) 306 may be located at other headset locations as well. Also note that in some examples, inward-facing cameras 310 may also be mounted within the headset 216 and oriented to image the user's eyes for eye tracking while the user wears the headset 216 (e.g., to determine where a user is looking in 3D space to select a real world or graphical object).

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

Before describing FIG. 4, it is to be understood that an app sometimes called App Space/AppSpace below may handle coordinate conversions and action/event translations between a headset's own SDK that might be provided by the headset's manufacturer (and that presents 3D content stereoscopically and manages 3D user interactions) and a 2D app operating on a connected smartphone. Thus, App Space may make immersive AR/VR/MR interactions possible for 2D apps that have not been configured for 3D space. App Space may therefore render the 2D apps in a 3D spatial environment, as well as convert 3D coordinates in the 3D spatial coordinate system into 2D coordinates in the 2D coordinate system at runtime (and vice versa). Thus, an app repositioning system is enabled by App Space to place the 2D apps in the 3D spatial environment (e.g., in square orientation by default as set forth further below). App Space's coordinate conversions can be extended to all the interactions afforded by the underlying 3D headset SDK, such as raycast, scroll, swipe, long-press, double tap, gesture and voice.

Figure 4:
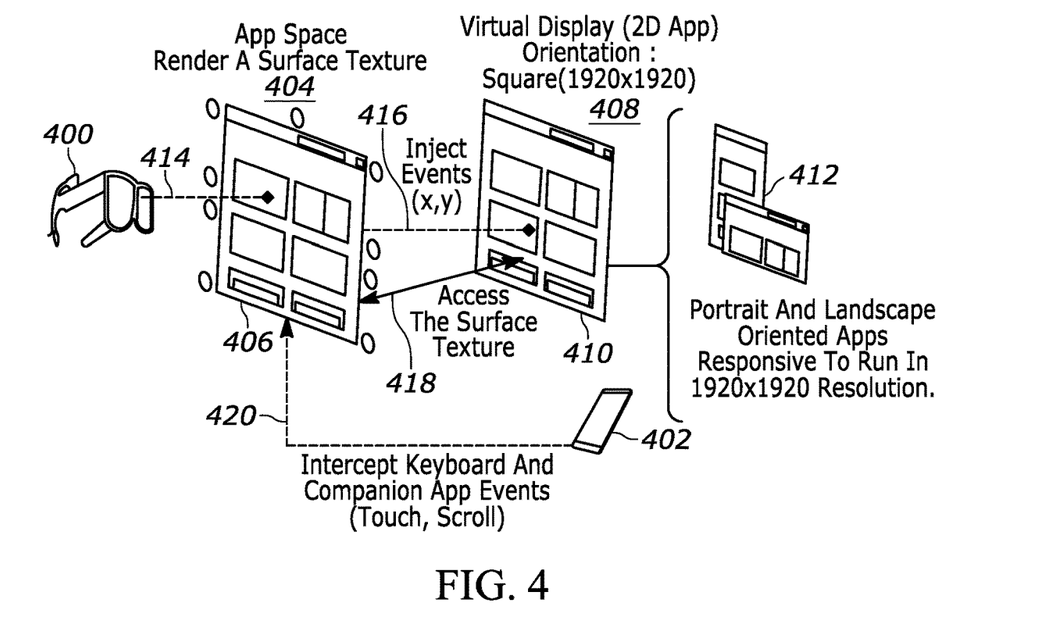
FIG. 4 is a schematic of example hardware and software architecture for content rendering consistent with present principles.

Now specifically in reference to FIG. 4, it shows a schematic of example hardware and software architecture. Thus, a headset 400 is shown and may be similar to the headset 216 described above. A mobile device 402 is also shown, where the mobile device 402 may be a smartphone, tablet computer, laptop computer, or other computing device.

FIG. 4 also shows that a first app 404—App Space in non-limiting examples—may execute at the device 402 to stereoscopically render a surface texture/canvas 406 in 3D coordinates on the display of the headset 400 and hence to a wearer of the headset 400. The device 402 may also execute a second app 408 that is already configured to present content in 2D coordinates on the display of the device 402 itself. Thus, the 2D app may be executed for the device 402 to present a virtual display 410 in, for example, square orientation in 1920×1920 pixel format by default once portrait and/or landscape-oriented presentations 412 of the 2D app have been converted into square orientation by the device 402 (e.g., by App Space itself, by the guest operating system such as Google's Android, by another app executed by the GOS such as a news app or weather app that accesses the internet to present visual content and is running on the device 402, and/or by APIs of Android (an Android Virtual Display Service)). The content of the virtual display 410 may then act as the base for the content of the surface texture/canvas 406 that is rendered in 3D, with it being reiterated that the virtual display 410 may be generated by the guest operating system (GOS) of the mobile device itself (e.g., Android). The virtual display 410 (and by extension, the texture/canvas 406) may also have the same frame rate (e.g., 60 Hz) as the frame rate for the underlying 2D app itself as would be used to present the 2D app's content on the mobile device's own display.

Thus, as shown by line 414, the surface texture 406 is projected into the user's 3D view while wearing the headset 400 (by App Space 404 itself or after App Space 404 provides the surface texture 406 to the headset's own 3D SDK app for 3D rendering (which may be a separate app than App Space itself)), with App Space 404 initially accessing/generating the surface texture/canvas 406 using the virtual display 410 of the 2D app 408 (as demonstrated by line 418). Additionally, 3D events and actions taken by the user in 3D space while interacting with the 3D virtual environment may be injected into the 2D virtual display space 410 running on the device 402 in x,y pixel coordinates once converted into those coordinates by App Space 404, as demonstrated by line 416. App Space 404 may also intercept keyboard and other app events executing at the companion 2D app 408 and represent them in the 3D surface texture 406, as represented by line 420. For instance, touches to the touch-enabled display of the device 402 may be intercepted, as may scroll events.

Accordingly, as understood herein, in non-limiting examples App Space 408 may be a 3D app package and mobile service that bring 2D apps into a 3D space app. The App Space service may wrap underlying OS Virtual Display application programming interfaces (APIs). 2D apps may be opened in the secondary virtual display 410 for which the surface texture is accessible to App Space in a 3D engine. App Space may thus render the surface texture 406 in 3D space and manage the texture 406 with additional user interface (UI) controls. App Space may detect gaze, raycast, keyboard, and keypress events from any buttons on the head-mounted headset 400 itself or even other controller devices (such as 3D hand-held controllers) via the headset's own SDK for 3D rendering. All the detected events may then be injected to the respective virtual display 410 at the intercepted coordinates and thus to the underlying 2D app 408.

Also note that, using App Space, multiple 2D apps can be rendered at the headset 400 concurrently and placed in the 3D space along a 360-degree field of view for the user's convenience. Thus, the 2D apps may be assigned a spatial anchor in 3D coordinates to keep the 2D content virtually presented in 3D at a particular real world location (for AR) or virtual world 3D location (for VR).

Thus, in one example embodiment per the schematic of FIG. 4, the following environment may be used (although present principles may also be extended to other setups as well). First, the head mounted display device 400 itself may be a Lenovo ThinkReality A3 device. The 3D engine that is used may be the Unity 3D engine. The headset SDK itself may be the Android SDK and/or Lenovo ThinkReality SDK. The controlling software may be the app running on the device 402, such as App Space itself. In the present non-limiting example, the computing device 402 itself is a Motorola g100 running a version of the Android operating system (OS). The virtual display technology that is used may be Android Virtual Display and/or native APIs from the underlying OS (e.g., Virtual Display APIs from underlying OS/Native layer such as Android).

Figure 5:
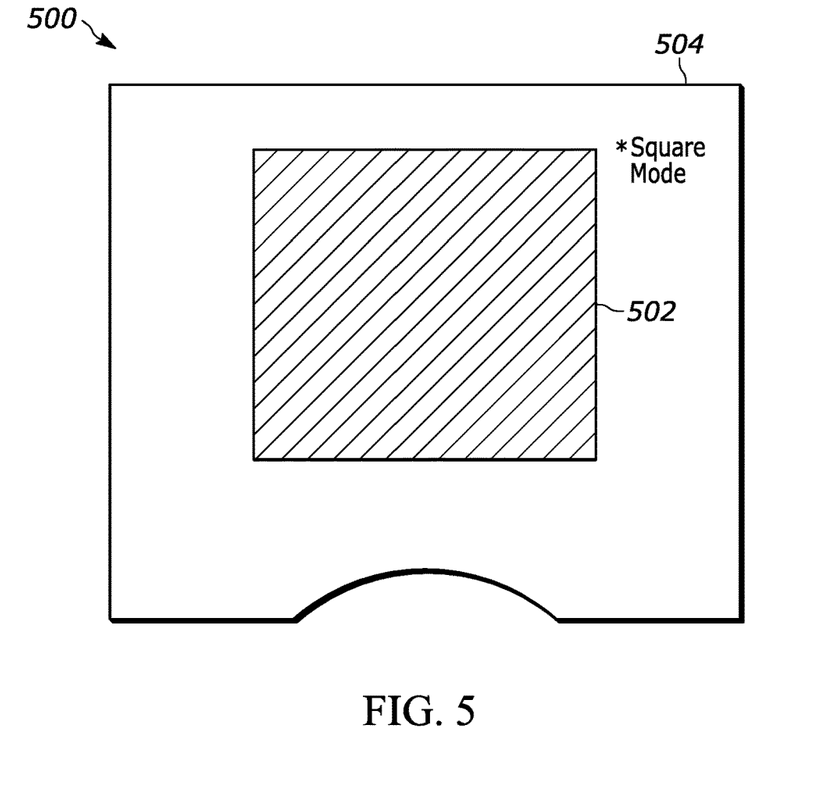
FIG. 5 shows an example graphical user interface (GUI) with content being presented in square orientation consistent with present principles.

Now in reference to FIG. 5, an example App Space canvas 500 is shown that may be similar to the surface texture/canvas 406 described above. Content from the 2D app has been omitted for simplicity but may be located in a square-shaped area 502 of the canvas 500 as presented stereoscopically by App Space and/or the native 3D software. The area 502 may establish a square orientation for the content consistent with present principles, and as such may be established by equal height and width. For example, the square orientation may be established by a 1920×1920 resolution at 520 dots per inch (dpi) in certain specific examples. Note that here the canvas 500 also establishes a graphical user interface (GUI) and that, as part of this GUI, an indication 504 includes a non-text icon and text indicating that the mobile device/headset is currently operating in square mode to present content in square orientation at the headset.

Figure 6:
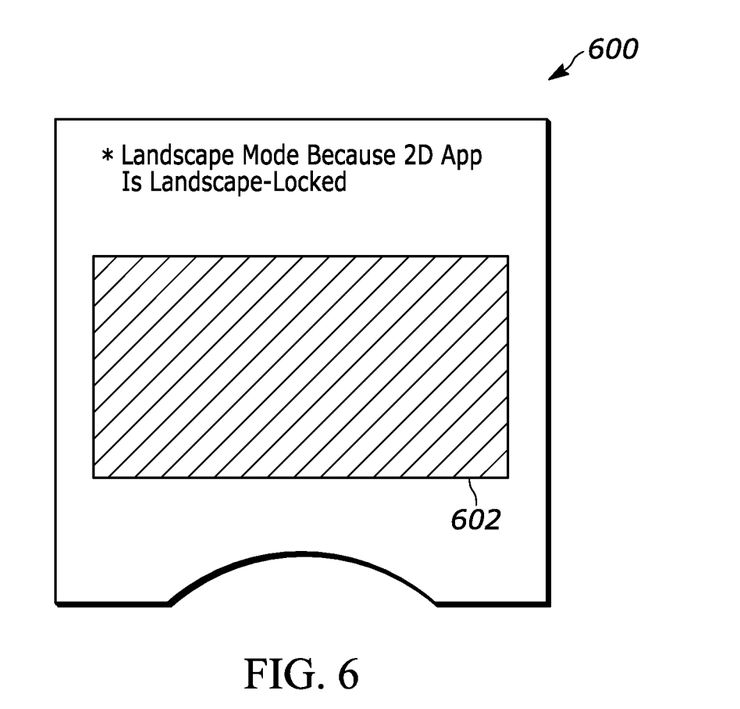
FIG. 6 shows an example GUI with content being presented in landscape orientation consistent with present principles.

Turning to FIG. 6, suppose that at runtime and while the mobile device is presenting content at the headset in square orientation according to the square mode, a user provides a command that a 2D app that only presents content in landscape orientation (regardless of mobile device orientation) present a 3D version of its content in 3D at the headset. Or as another example, suppose that a user has locked the 2D application into landscape orientation so that orientation does not change at the mobile device to portrait orientation or any other type of orientation, regardless of device orientation changes. Or as yet a third example, suppose a user has entered full-screen presentation of content from a 2D app such as YouTube that results in the app presenting content in landscape orientation and full screen at the mobile device's own display and maintains landscape orientation so long as the video content is presented full screen in this locked landscape orientation. In any of these situations, responsive to the mobile device switching to landscape orientation for presentation of the corresponding 2D content, the mobile device may also present the stereoscopic 3D version of the same content at the headset display in landscape orientation as well (rather than square orientation). This may be done since the headset has a relatively wide horizontal field of view (FOV) and may be particularly suited for presenting landscape-oriented content but not necessarily portrait-oriented content (which may appear unduly small or distorted).

Then when the user opens another 2D app that does not always present content in landscape orientation, unlocks the 2D app from presenting content in landscape orientation, or exits the full-screen mode in which landscape orientation is used, the mobile device may provide the virtual display in square orientation again for presentation in 3D at the headset display.

With the foregoing in mind, FIG. 6 shows a canvas 600 generated from a virtual display with landscape-oriented content. The canvas 600 may also be presented in 3D stereoscopically at the headset by App Space and/or the native 3D software just as with the canvas 500. Thus, note that while content from the 2D app has been omitted for simplicity, the content is located in a landscape-oriented area 602 of the canvas 600 as presented stereoscopically. As shown in FIG. 6, the area 602 may have a longer width than height as presented to the user at the headset. For example, the landscape orientation may be established by a 1920×1080 resolution. Note that here the canvas 600 also establishes a GUI and that, as part of this GUI, an indication 604 includes a non-text icon and text indicating that the mobile device/headset is currently operating in landscape mode to present content in landscape orientation at the headset.

Figure 7:
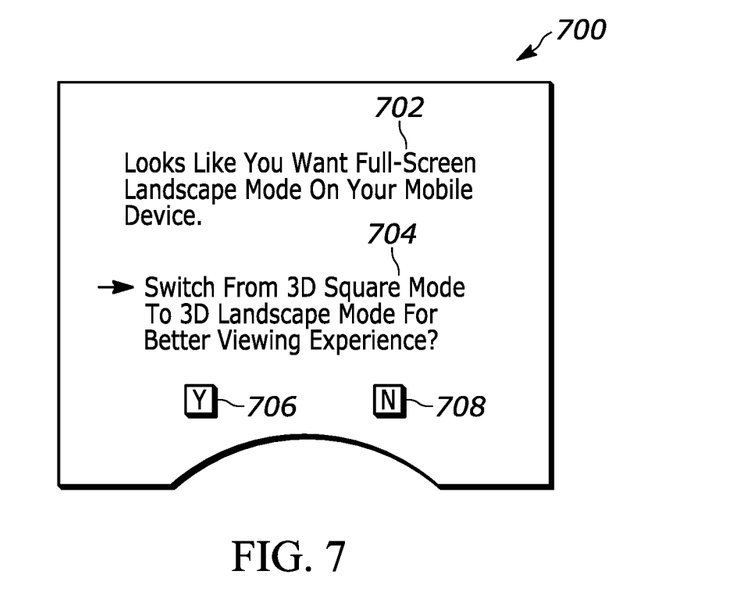
FIG. 7 shows an example GUI prompting an end-user to choose whether to switch from square orientation to landscape orientation consistent with present principles.

Turning now to FIG. 7, note that in addition to or in lieu of the mobile device autonomously switching presentation of 3D content at the headset display from square orientation to landscape orientation, in some examples responsive to the opening of the landscape-only app, the locking of landscape orientation, or the entering of a full-screen mode, the mobile device may instead give the end-user the option to choose whether to switch from square orientation to landscape orientation. Accordingly, a GUI 700 may be presented in 2D at the mobile device display and/or stereoscopically in 3D at the headset display.

As shown in FIG. 7, the GUI 700 includes a note 702 that the user is trying to, in the present example, enter full-screen content presentation in landscape orientation on the mobile device. As also shown, the GUI 700 may include a prompt 704 asking the end-user whether the user wishes to switch 3D content presentation of the same content from the 2D app from 3D square orientation to 3D landscape orientation for a better viewing experience at the headset. The user may command the mobile device to make the switch by selecting the "yes" selector 706, or the user may choose to remain in square mode/orientation by selecting the "no" selector 708.

Moving on from FIG. 7, this detailed description also recognizes that in some instances, such as where portrait-oriented content is presented in square orientation or where content has been hard-coded at the 2D app for 2D pixel coordinates, the content may appear stretched in the horizontal dimension when presented in 3D square orientation at the headset's display. In such an instance, the App Space developers or a third party developing a plugin/application programming interface (API) for App Space to modify its functionality may provide, as part of App Space or in cloud/server storage accessible to the mobile device, a list of verified apps that are certified/tested to not stretch while presented in square orientation. The verified list may therefore specify which apps the mobile device can open in square orientation with content integrity maintained, and in various specific examples only those apps may be get listed on the headset display's own home screen/main launcher for providing the launch command from the headset (even though launch/execution may still occur at the connected mobile device).

Figure 8:
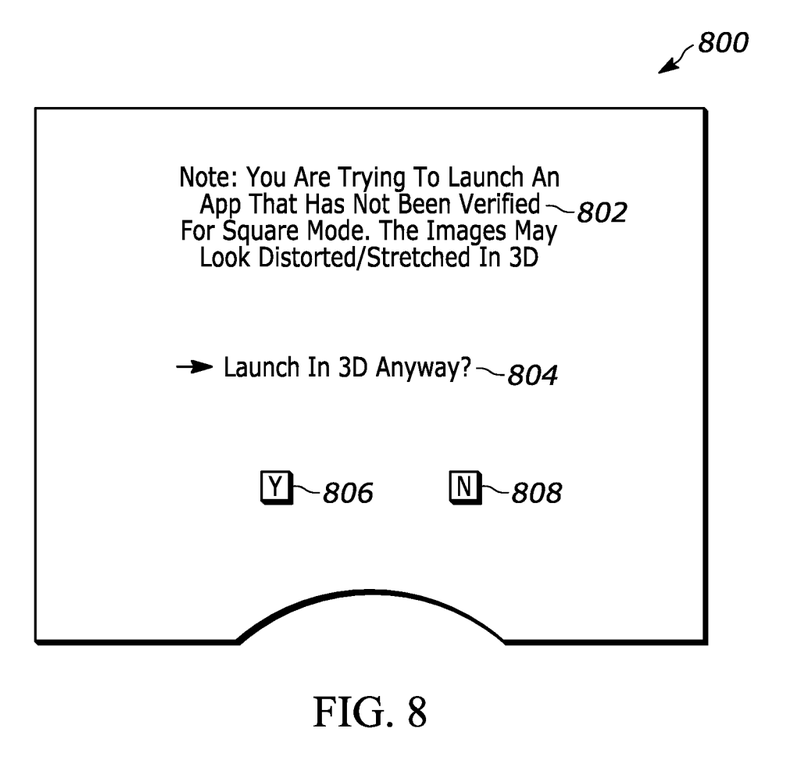
FIG. 8 shows an example GUI prompting an end-user to choose whether to present potentially stretched content in square orientation consistent with present principles.

For other apps that are not listed in the list, when the user attempts to launch one of those apps the GUI 800 of FIG. 8 may be presented so that the end-user can choose whether to present potentially stretched content from that app. Accordingly, as shown in FIG. 8 that GUI 800 may include a disclaimer 802 that the app the user is trying to launch is an app that has not been verified for presenting non-stretched content in square mode and that the content/images from the app may look stretched or otherwise distorted.

But the GUI 800 may also include a prompt 804 asking whether the user would like to launch the 2D app anyway for App Space to then convert its content into 3D content for stereoscopic presentation at the headset display. The user may then command the mobile device to launch the app and present the 3D content anyway by selecting the "yes" selector 806, or the user may command the mobile device to decline to launch the app/present the underlying content in 3D by selecting the "no" selector 808. And note for completeness that the GUI 800 itself may be presented in 2D at the mobile device display and/or may be presented stereoscopically in 3D at the headset display.

Figure 9:
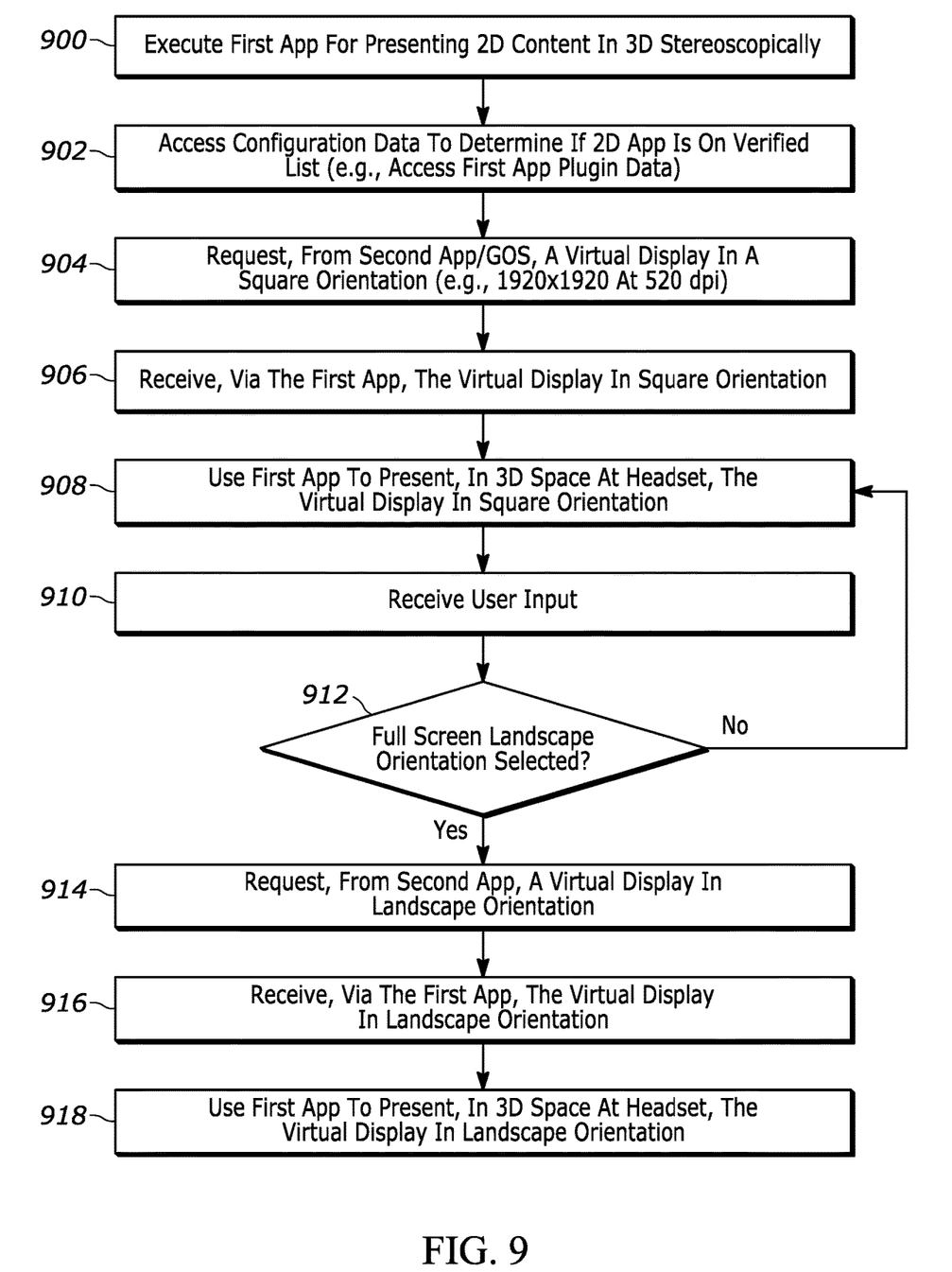
FIG. 9 illustrates example overall logic in example flow chart format that may be executed by one or more devices such as a mobile device consistent with present principles.

Referring now to FIG. 9, it shows example overall logic that may be executed consistent with present principles by a device such as the system 100, a mobile device, and/or a coordinating server in any appropriate combination. Beginning at block 900, the mobile device may execute a first app (e.g., App Space) at the mobile device, where the first app may be configured for interfacing presentation of content between 2D space and 3D space to thus present 2D content from a 2D app (as based in pixel coordinates) stereoscopically in 3D (as based in 3D texture coordinates established by e.g., bitmap images). The logic may then move to block 902.

At block 902 the device may access configuration data (e.g., the verified list described above in reference to FIG. 8) indicating that content from various 2D apps are approved for presentation in square orientation to then determine whether a user-selected 2D app is indicated in the configuration data (e.g., on the verified list) for apps verified to not have their content stretched when presented in square orientation at the headset. For example, the configuration data (such as the verified list) may form part of a plugin for the first app (e.g., App Space), or may be included in the main body of App Space itself.

Thereafter the logic may proceed to block 904 where, assuming the 2D app is indicated in the configuration data as being verified for square orientation presentation or assuming that the user has provided input through a GUI like the GUI 800 to present the 2D app's content in 3D anyway, the device may request a virtual display in square orientation for the 2D content from the 2D app. In certain specific examples, the first app itself (e.g., App Space) may provide the request to a second app such as the mobile device's own GOS (e.g., Android) or even the individual 2D app itself that might access the Internet to present visual content (e.g., a news, email app, etc.). In either case, note that the second app may already be configured for providing virtual displays in square orientation, 1920×1920 resolution at 520 dpi or otherwise.

Thereafter, the logic may proceed to block 906 where the device may receive, via the first app and from the second app, the virtual display in square orientation. The logic may then proceed to block 908 where the device may use the first app to stereoscopically present, in 3D space on the display of the headset, the virtual display in the square orientation.

After block 908, the logic may proceed to block 910. At block 910 the device may receive user input to present content from a third app (a 2D app different from the first app/App Space and different from the second app/GOS) in landscape mode. Again this may include user input to enter a full-screen mode, user input to launch an app that only presents content in landscape orientation, and/or user input to lock the content orientation into landscape orientation so that the content orientation does not change with mobile device orientation changes.

Then, at decision diamond 912, the device may determine based on the user input whether full-screen landscape orientation has in fact been selected for presenting 2D content in 2D at the mobile device's display. Additionally or alternatively, at diamond 912 the device may determine whether the user has provided a command to launch an app that presents content only in landscape orientation or has provided a command to lock content orientation for a 2D app into landscape orientation.

A negative determination at diamond 912 may cause the logic to proceed back to block 908 to continue presenting content in square orientation. However, an affirmative determination at diamond 912 may instead cause the logic to proceed to block 914. At block 914, based on the user input, the device may request a virtual display in a landscape orientation from the second app. In response, at block 916 the device may receive, via the first app and from the second app, the virtual display in the landscape orientation. Thereafter, the logic may proceed to block 918 where the device may use the first app to present, in 3D space on the display of the headset, the virtual display in the landscape orientation.

Content may continue to be presented at the headset in landscape orientation at least until full-screen mode is exited at the mobile device, the landscape-only app is closed or exited form active presentation, and/or landscape mode for the given 2D app is unlocked. Once any of those things happen, the first app may again request square orientation content from the second app for presentation at the headset accordingly.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least a first device, comprising:
   at least one processor; and
   storage accessible to the at least one processor and comprising instructions executable by the at least one processor to:
   execute a first application (app) at the first device, the first app configured for interfacing presentation of content between two dimensional (2D) space and three dimensional (3D) space;
   request, from a second app, a virtual display in a square orientation;
   receive, via the first app, the virtual display in the square orientation; and
   use the first app to present, in 3D space on a display of a headset, the virtual display in the square orientation;
   wherein the square orientation is established by a 1920× 1920 resolution at 520 dots per inch (dpi).

2. The at least first device of claim 1, wherein the second app is a guest operating system.

3. The at least first device of claim 1, wherein the second app is a 2D app that accesses the Internet to present visual content.

4. The at least first device of claim 1, wherein the first app issues the request.

5. The at least first device of claim 4, wherein the first app issues the request based on the first app accessing configuration data indicating that content from a third app is approved for presentation in square orientation.

6. The at least first device of claim 5, wherein the third app is different from the second app.

7. The at least first device of claim 5, wherein the configuration data forms part of a plugin for the first app.

8. The at least first device of claim 1, wherein the instructions are executable to:
   receive user input to present content from a third app in a landscape orientation;
   based on the user input, request, from the second app, a virtual display in the landscape orientation;
   receive, via the first app, the virtual display in the landscape orientation; and
   use the first app to present, in 3D space on the display of the headset, the virtual display in the landscape orientation.

9. The at least first device of claim 8, wherein the user input comprises input to present content from the third app full-screen.

10. The at least first device of claim 1, comprising the headset.

11. The at least first device of claim 10, comprising a mobile device, the mobile device executing the first and second apps, the mobile device being different from the headset.

12. The at least first device of claim 1, wherein the first app presents the virtual display stereoscopically.

13. The at least first device of claim 1, wherein the instructions are executable to:
   present, with the virtual display in the square orientation, an indication that content is being presented in the square orientation, the indication being different from the square orientation.

14. A method, comprising:
   executing a first application (app) at a first device, the first app configured for presenting content stereoscopically in three dimensional (3D) space using a headset;
   using the first app to request, from a second app, a virtual display in a square orientation;
   receiving, at the first app and from the second app, the virtual display in the square orientation; and
   using the first app to present, in 3D space on a display of the headset, the virtual display in the square orientation;

wherein the virtual display is presented in the square orientation at 520 dots per inch.

15. The method of claim 14, wherein the second app is a guest operating system of a mobile device.

16. The method of claim 14, wherein the square orientation is established by a 1920×1920 resolution.

17. The method of claim 14, comprising:
using the first app to issue the request.

18. The method of claim 14, wherein the square orientation is established by a resolution of equal height and width.

19. The method of claim 14, comprising:
presenting, with the virtual display in the square orientation, an indication that content is being presented in the square orientation, the indication being different and apart from the square orientation.

20. At least one computer readable storage medium (CRSM) that is not a transitory signal, the at least one computer readable storage medium comprising instructions executable by at least one processor to:
execute a first application (app) at a first device, the first app configured for presenting content stereoscopically in three dimensional (3D) space using a headset;
use the first app to request, from a second app, a virtual display in a square orientation;
receive, from the second app, the virtual display in the square orientation; and
use the first app to present, in 3D space on a display of the headset, the virtual display in the square orientation;
wherein the square orientation is established by a 1920×1920 resolution at 520 dots per inch (dpi).

* * * * *